United States Patent [19]

Redmore et al.

[11] 4,315,087
[45] Feb. 9, 1982

[54] QUATERNARY POLYAMINOAMIDES

[75] Inventors: Derek Redmore, Ballwin; Benjamin T. Outlaw, St. Louis, both of Mo.

[73] Assignee: Petrolite Corporation, St. Louis, Mo.

[21] Appl. No.: 571,927

[22] Filed: Apr. 28, 1975

[51] Int. Cl.³ .............................................. C08G 73/02
[52] U.S. Cl. ................................ 525/421; 252/8.55 E; 252/392; 528/363
[58] Field of Search ................ 260/89.5 N, 89.5 S, 260/78 SC; 526/11.1; 252/8.55 E, 392; 525/421

[56] References Cited

U.S. PATENT DOCUMENTS

| | | | |
|---|---|---|---|
| 2,824,861 | 2/1958 | Conbere | 260/89.5 N |
| 2,843,573 | 7/1958 | Melamed | 260/89.5 S |
| 2,965,594 | 12/1960 | Maeder | 260/89.5 N |
| 3,445,441 | 5/1969 | Rushton | 260/89.5 N |
| 3,505,235 | 4/1970 | Muzyczko et al. | 252/82 |
| 3,530,215 | 9/1970 | Grief | 260/89.5 N |
| 3,678,098 | 7/1972 | Lewis | 260/89.5 N |
| 3,766,156 | 10/1973 | Kine | 260/89.5 N |
| 3,842,054 | 10/1974 | Keim | 260/89.5 N |

*Primary Examiner*—Paul R. Michl
*Attorney, Agent, or Firm*—Sidney B. Ring; Hyman F. Glass

[57] ABSTRACT

This invention relates to quaternary polyaminoamides. The polyaminoamides are prepared by reacting acrylate-type compounds with polyamines as disclosed in U.S. Pat. No. 3,445,441. This invention also relates to uses for the quaternized polymer, particularly in the prevention of corrosion.

9 Claims, No Drawings

QUATERNARY POLYAMINOAMIDES

U.S. Pat. No. 3,445,441 relates to amino-amido polymers characterized by being a reaction product of at least a polyamine and an acrylate-type compound having the formula

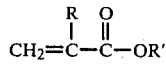

where R is hydrogen or methyl and R' is methyl, ethyl, propyl, isopropyl, butyl, sec-butyl, tert-butyl, aryl or hexyl. Such polymers are used to break oil-in-water emulsions, to inhibit corrosion, and to clarify water.

These polymers are characterized by both amido and amino groups. In their simplest embodiments they may be represented by units of the following idealized formula:

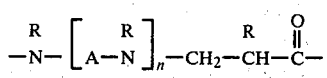

where the R's, which may be the same or different, are hydrogen or a substituted group, such as a hydrocarbon group, for example alkyl, alkenyl, alkinyl, aryl, etc. and A is a moiety of the polyamine which, for example, may be aryl, cycloalkyl, alkyl, etc., and n is an integer such as 1-10 or greater.

The above simplified formula represents a linear polymer. However, cross-linked polymers may also be formed by employing certain conditions since the polymer has labile hydrogens which can further react with either the unsaturated moiety by adding across the double bond or by amidifying with a carboxylate group. For example, a polymer of the formula

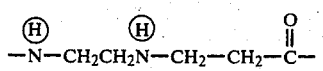

having the labile hydrogens indicated by the circles which may react with a monomer

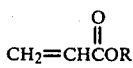

for example as follows:

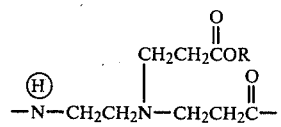

This can further polymerize to form a polymer of the type

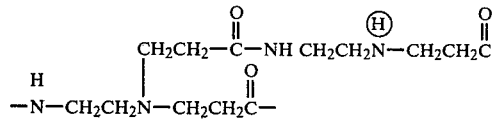

Further cross-linking can also take place in a similar manner by reactions of the labile hydrogen. The amido hydrogen is believed to be less labile than the amino hydrogen. Cross-links can grow from one or more points indicated by the encircled hydrogens.

In addition, cross-linking may also take place by amidification of the labile hydrogens, for example, as follows:

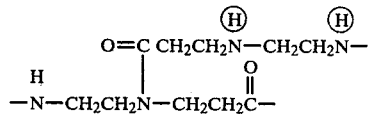

Further reaction and cross-links may also occur at the other labile hydrogens in a similar manner for example, in accord with the following formula:

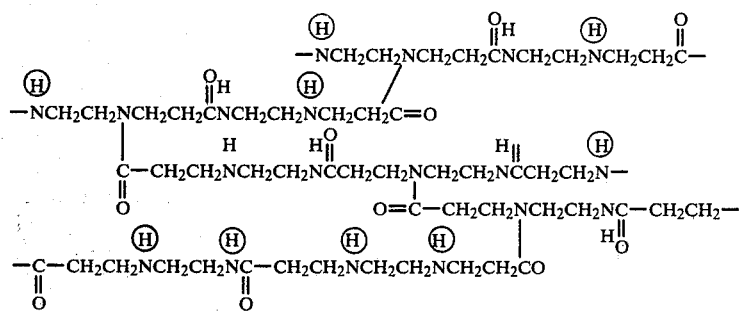

Polymers may also be formed in the following manner:

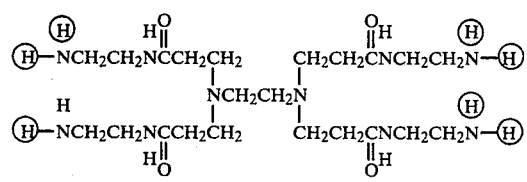

and the polymer can continue to grow out of any of the points indicated by the encircled hydrogen, particularly at the more labile non-amido hydrogens.

The above formulae are presented to indicate possible methods by which cross-linking or other reactions can occur but it is not to be assumed that these are the sole means by which cross-linking or other reactions may occur.

The present invention relates to the quaternized derivatives of the amino-amido polymers of U.S. Pat. No. 3,445,441 and to uses thereof in the processes described in U.S. Pat. No. 3,445,441. They are more effective as corrosion inhibitors, particularly in high temperature and highly corrosive systems than the parent non-quaternized polymers. They are particularly useful in high temperature systems where high concentrations of $CO_2$ and/or $H_2S$ are present.

The quaternary derivatives are prepared in the conventional manner by reacting the polymer with the quaternizing agent. This is conveniently carried out at temperatures of from room temperature to reflux temperature or higher for a period sufficient to form the desired product such as from 0.5 to 5 hrs., but preferably at reflux from 1-3 hrs.

The equivalency ratio of alkylating reagents to basic nitrogen equivalency in the polyaminoamides can vary from about 0.1 to 2.0, such as from about 0.2 to 1.8, for example from about 0.5 to 1.5, but preferably from about 0.7 to 1.1. Theoretically, one may alkylate only one amino basic nitrogen group up to all available amino (or basic nitrogen) groups.

The following non-limiting examples illustrate the preparation of polymeric aminoamides.

EXAMPLE 1

Polyaminoamide from methyl acrylate and ethylene diamine.

To ethylene diamine (120 g; 2 mole) in flask fitted with stirrer, reflux condenser and addition funnel was added methyl acrylate (86 g; 1 mole) during 1 hour at 45°–55°. The mixture was heated under reflux for 1 hour (pot temperature 100°–115°) and then flask was fitted with a still head. Methanol (32.4 g) was removed by distillation at atmospheric pressure. The mixture was then heated gradually to 175° under reduced pressure, 95–100 mm, resulting in distillation of excess ethylene diamine (60.1 g). The viscous residue was dissolved in water (113 g).

Analysis of product (before dilution with water):
Total nitrogen 22.2%
Basic nitrogen 13%.

EXAMPLE 2

Polyaminoamide from methyl methacrylate and ethylene diamine.

To ethylene diamine (60 g; 1 mole) was added methyl methacrylate (100 g; 1 mole) during 20 mins. with efficient stirring. The reaction mixture was gradually heat to 110°–115° during which methanol began to form. The methanol was allowed to distill from the reaction flask as the temperature was increased to 165° during 2½ hours. (Methanol, 32 g was collected). The viscous polymer resulting was dissolved in water (130 g).

Analysis (without water):
Total nitrogen 23.7%
Basic nitrogen 13.4%.

EXAMPLE 3

Polyaminoamide from diethylene triamine and methyl methacrylate.

Methyl methacrylate (100 g; 1 mole) was added dropwise in 20 mins. to diethylene triamine (103 g; 1 mole) with good stirring. The mixture was gradually heated to 160° with gradual removal of methanol (35 g) by distillation. The resulting polymer was dissolved in water (170 g).

EXAMPLE 4

Polyaminoamide from a polyamine mixture and methyl methacrylate.

Following the procedure of Example 3 Amine #1 (a mixture of diethylene triamine, triethylene tetramine, and tetraethylene-pentamine) (100 g) was reacted with methyl methacrylate (100 g). The resulting polymer was dissolved in water (165 g).

Analysis (without water):
Total nitrogen 21.97%
Basic nitrogen 12.9%.

EXAMPLE 5

Following the procedure of Example 3 amine AL-1 (polyamine mixture from Jefferson Chemical Co.) (100 g) was reacted with methyl methacrylate (100 g). The resulting gum was dissolved in water (100 g).

Analysis (before dissolution in water):
Total nitrogen 16.59%
Basic nitrogen 9.3%.

The following examples illustrate the preparation of alkylated polyaminoamide structures:

EXAMPLE 6

The aminoamide polymer of Example 1 as a 50% aqueous solution (80 g; 0.37 eq. basic N) was heated with benzylchloride (43.3 g; 0.34 mole) under reflux for 2 hours. The product was diluted to 50% active using isopropanol (43 g). (mole ratio alkylating reagent to basic N of 0.92).

Analysis, Ionic chloride 14.7%
Calculated 15.1%.

EXAMPLE 7

The aminoamide polymer of Example 5 as a 62% aqueous solution (80 g; 0.53 eq. basic N) was heated under reflux with benzyl chloride (46.7 g; 0.37 mole) for 2 hrs. After cooling the product was diluted with isopropanol, a molar ratio of alkylating reagent to basic nitrogen of 0.70.

The following Table 1 summarizes additional quaternization reactions carried out by the procedure of Example 6.

TABLE 1

|            | Aminoamide polymer | Quaternization Reagents | Equivalency Ratio |
|---|---|---|---|
| Example 8  | Example 1 | methyl chloride         | 1.05 |
| Example 9  | Example 2 | p-dodecylbenzyl chloride | 0.70 |
| Example 10 | Example 2 | Ethylene dichloride     | 0.80 |
| Example 11 | Example 1 | Triethyl phosphate      | 0.80 |
| Example 12 | Example 5 | Triethyl phosphate      | 0.80 |
| Example 13 | Example 5 | p-dodecylbenzyl chloride | 0.90 |
| Example 14 | Example 5 | Methyl chloride         | 1.05 |
| Example 15 | Example 3 | Benzyl chloride         | 1.00 |

Since the reaction goes substantially (95–100%) to completion, at an equivalency ratio of 0.7, 70% of basic N is alkylated; at a mole ratio of 0.9, 90% is alkylated, etc.

The alkylated products formed from alkylating reagent RX may contain the following functional groups:

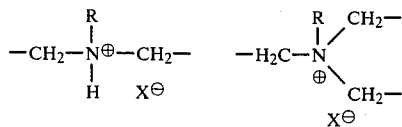

For example, a typical structure from polyaminoamide of Example 1 could be represented in part as follows:

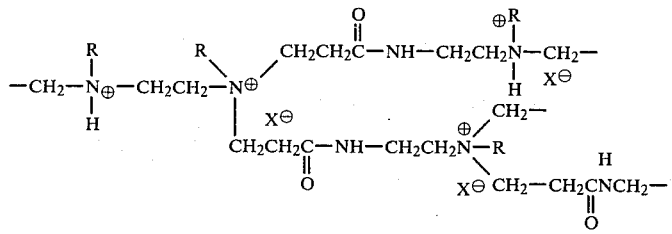

Thus, the polymer contains secondary and tertiary amido groups, quaternary ammonium groups

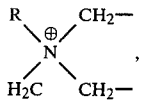

alkylated secondary amine functions

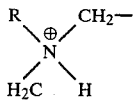

Although the invention is illustrated predominantly with monofunctional quaternizing agents, polyfunctional quaternizing agents can also be employed. The following is a presentation of various quaternizing agents which can be employed herein.

(1) Examples of Monofunctional Quaternizing Agents

Any hydrocarbon halide, e.g., alkyl, alkenyl, cycloalkenyl, aralkyl, etc., halide which contains at least one carbon atom and up to about thirty carbon atoms or more per molecule can be employed to alkylate the products of this invention. It is especially preferred to use alkyl halides having between about one to about eighteen carbon atoms per molecule. The halogen portion of the alkyl halide reactant molecule can be any halogen atom, i.e., chlorine, bromine, fluorine, and iodine. In practice, the alkyl bromides and chlorides are used, due to their greater commercial availability. Non-limiting examples of the alkyl halide reactant are methyl chloride; ethyl chloride; propyl chloride: n-butyl chloride; sec-butyl iodide; t-butyl fluoride; n-amyl bromide; isoamyl chloride; n-hexyl bromide; n-hexyl iodide; heptyl fluoride; 2-ethyl-hexyl chloride; n-octyl bromide; decyl iodide; dodecyl bromide; 7-ethyl-2-methyl-undecyl iodide; tetradecyl bromide; hexadecyl bromide; hexadecyl fluoride; heptadecyl chloride; octadecyl bromide; docosyl chloride; tetracosyl iodide; hexacosyl bromide; octacosyl chloride; and triacontyl chloride. In addition, alkenyl halides can also be employed, for example, the alkenyl halides corresponding to the above examples. In addition, the halide may contain other elements besides carbon and hydrogen, as, for example, where dichloroethylether is employed.

The alkyl halides can be chemically pure compounds or of commercial purity. Mixtures of alkyl halides, having carbon chain lengths falling within the range specified hereinbefore, can also be used. Examples of such mixtures are mono-chlorinated wax and mono-chlorinated kerosene. Complete instructions for the preparation of mono-chlorowax have been set forth in U.S. Pat. No. 2,238,790.

Thus, the term quaternizing as employed herein and in the claims include alkenylation, cycloalkenylation, aralkylation, etc., and other hydrocarbonylation as well as alkylation itself.

(2) Examples of Difunctional Quaternizing Agents

X—Z—X may be a wide variety of compounds, capable of joining amino groups, where Z may be alkylene, alkenylene, alkynylene, alkaralkylene, an alkylene-ether-containing group, an ester-containing group, etc., and X is a halide.

The following are non-limiting examples:

(I) Saturated dihalides $X-Z-X$ 

where Z is alkylene, straight chain or branched, for example $X(CH_2)_nX$ where n is 2–25 or more, for example 2–10, but preferably 2–4. The $+CH_2+_n-$ 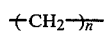

may be branched such as where at least one of the H's is a hydrocarbon group such as alkyl, i.e., methyl, ethyl, etc., substituted such as halo, hydroxy, etc.

(II) Aralkylene dihalides $X-Z-X$ 

where Z is aralkylene having for example 8–30 or more carbons, such as 8–20 carbons, but preferably xylylene.

The following are illustrative examples:

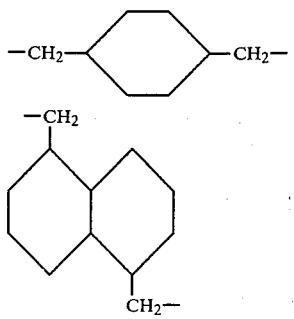

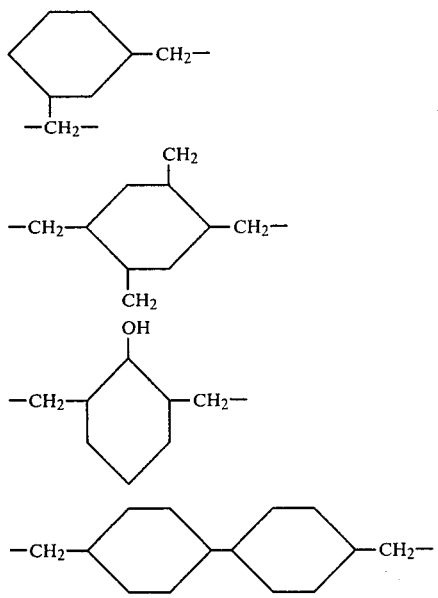

Additional examples of aralkylene radicals include those of the formula —CH₂—Ar—CH₂— where Ar is

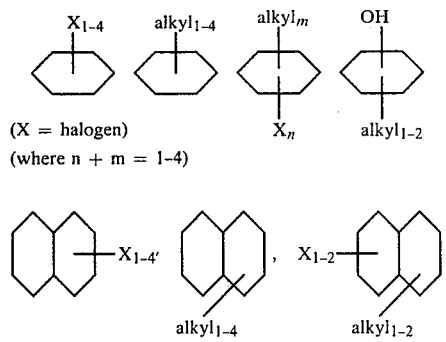

(X = halogen)
(where n + m = 1–4)

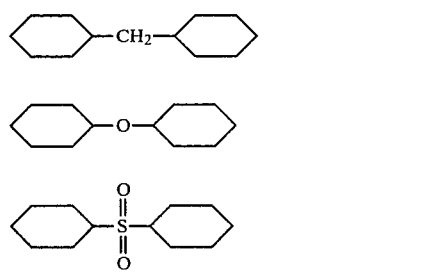

(III) Alkylene ethers $$X-A-X$$

where A is an alkylene ether radical —A(OA)$_n$ where A is alkylene (including cycloalkylene ether radicals) having for example from 1–10 or more carbons such as 1–4, but preferably 2 in each alkylene unit. Typical examples are

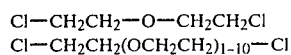

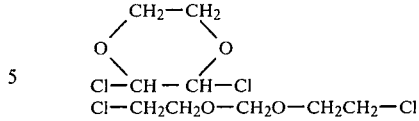

Additional examples of A include groups of the formula (AO)$_n$ where A is

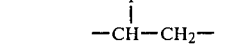

where Y is alkyl, for example

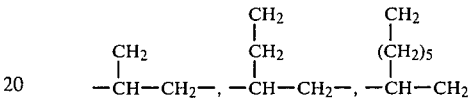

etc.

Thus, A can be methylene, polymethylene, ethylene, propylene, butylene, octylene, etc. In addition (AO)$_n$ may be homo or hetero as to A, to yield for example (ETO)$_a$(PrO)$_b$, or (PrO—ETO)$_n$;

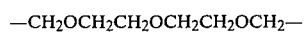

etc.

These compounds also include the formal of ethylene chlorohydrin and bromohydrin, for example

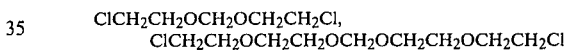

etc.

(IV) Unsaturated dihalides $$X-Z-X$$

where Z is an unsaturated aliphatic radical, for example

Although halides are the preferred anionic group, other anionic groups can also be employed such as

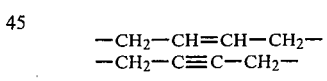

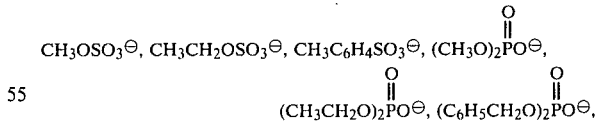

etc.

USE AS CORROSION INHIBITOR

Although a wide variety of corrosion inhibitors are known, they are not effective in all systems. For example, a corrosion inhibitor which is effective at low temperature, atmospheric pressure, or neutral or slightly acidic conditions would not be effective at high temperature, high pressure, and highly acidic conditions. Stated another way, the mechanism of corrosion is so unique to each system that despite theoretical consideration, selection of corrosion inhibitors is often more empirical than theoretical.

Because of the world wide shortage of petroleum products, deeper wells are now being drilled to tap new petroleum fields. However, increased depth poses more severe corrosion problems. For example as one drills to depths in excess of 10,000 ft., one encounters temperatures in excess of about 200° F., such as from about 200° to 550°, for example from about 250° to 500°, but generally within range of about 300° to 450°; pressures in excess of about 5,000 psi, such as from about 5,000 to 30,000, for example from about 7,500 to 20,000, but generally in the range of about 8,000 to 18,000; and high acidity, particularly that due to $H_2S$, $CO_2$, etc., for example $H_2S$ or $CO_2$ partial pressures of acidic gases in excess of about 10, such as from about 10 to 20,000, for example from about 100 to 10,000, but generally from about 200 to 5,000.

Conditions as extreme as these place great corrosive stress upon the tubing employed in such wells. Thus, when drilling such wells costs in excess of $5–$6 million dollars, approximately half of which is tubing, the importance of effective corrosion inhibition is evident. However, when conventional oil well corrosion inhibitors are employed they are found to be of little or no effectiveness since they tend to degrade, volatilize, polymerize, and either lose effectiveness as corrosion inhibitors or polymerize so as to clog the tubing.

We have further discovered that the compositions of this invention are effective as corrosion inhibitors in systems of high temperature, high pressure and high acidity, particularly in deep well, and most particularly in deep gas wells.

The effectiveness of the inhibitors of this invention is illustrated with the following tests which are designed to simulate the extreme conditions of deep wells.

$CO_2$ PROCEDURE

Four hundred ml. of de-ionized water are charged to a stainless steel test vessel fitted with mild steel coupons, and the liquid is sparged to 1.5 hours with $CO_2$ to remove the $O_2$. The vessel is then put on a magnetic stirring hot plate and brought up to temperature (250° F.). At this time, 100 p.s.i. $CO_2$ was added and the electrodes allowed to freely corrode for 1.5 hours. The corrosion rate is measured with a PAIR meter (blank, $R_o$). The inhibitor is then added with an overpressure of 100 p.s.i. additional $CO_2$ and the corrosion rates measured ($R_1$).

The % protection = $(R_o - R_1)/R_o \times 100\%$.

| Compound | Concentration | Corrosion Rates (mpy) | | Protection |
|---|---|---|---|---|
| | | Blank $R_o$ | Inhibited after 20 hrs. $R_1$ | |
| Example 9 | 500 ppm | 450 | 168 | 63% |
| Example 10 | 500 ppm | 640 | 227 | 65% |
| Example 6 | 500 ppm | 450 | 370 | 18% |
| Example 12 | 500 ppm | 380 | 178 | 53% |

$H_2S/CO_2$ PROCEDURE 400 ml. of de-ionized water are charged into a stainless test bomb. The water is sparged for 1½ hours with nitrogen to remove the oxygen content. Followed by addition of 100 p.s.i.g. $H_2S$ and 50 p.s.i. of $CO_2$. The bomb is brought up to temp (250° F.) and the electrodes are allowed to corrode for 1½ hours. The corrosion rate is measured at this time (blank $R_o$). The inhibitor to be evaluated is charged into the bomb with an additional 50 psi of $CO_2$ and the corrosion rates measured by PAIR meter.

% Protection = $(R_o - R_1)/R_o$.

| Compound | Concentration | Corrosion Rates (mpy) | | Protection |
|---|---|---|---|---|
| | | Blank $R_o$ | Inhibited after 20 hrs. $R_1$ | |
| Example 12 | 500 ppm | 300 | 165 | 45% |
| Example 7 | 500 ppm | 250 | 24 | 90% |
| Example 6 | 500 ppm | 250 | 35 | 86% |
| Example 9 | 500 ppm | 300 | 76 | 75% |
| Example 10 | 500 ppm | 240 | 46 | 81% |

In the above tests, the corresponding non-quaternary polymers gave little, if any, protection.

In addition to its use as a corrosion inhibitor, the compositions of this invention can also be used as O/W demulsifiers, flocculation agents, etc.

The concentration of the corrosion inhibitors of this invention can vary widely depending on the particular composition, the particular system, etc. Concentration of at least about 5 ppm, such as about 10 to 10,000 ppm, for example from about 25 to 7,500 ppm, advantageously about 50 to 5,000 ppm, but preferably from about 100 to 1,000 ppm may be employed. Larger amounts can also be employed, such as 1.5 to 5%, although there is generally no commercial advantage.

We claim:

1. Quaternaries of polymers of the general unit formula

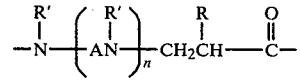

where R is hydrogen or methyl, R' is hydrogen, A is a —$CH_2CH_2$— moiety of a hydrocarbon polyamine which links amino groups and n is an integer; and crosslinked derivatives thereof, where the polyamine is of the general formula

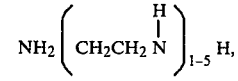

wherein the quaternizing agent is selected from the group consisting of benzyl chloride, ethylene dichloride and p-dodecyl benzyl chloride.

2. The composition of claim 1 wherein the quaternizing agent is benzyl chloride.

3. A process of inhibiting corrosion in a corrosive-fluid handling system which comprises treating the fluid in the system with the composition of claim 2.

4. The composition of claim 1 quaternized with ethylene dichloride.

5. The composition of claim 1 quaternized with p-dodecyl benzyl chloride.

6. A process of inhibiting corrosion in a corrosive-fluid handling system which is a deep well subject to temperature in excess of 200° F. and pressure in excess of 5,000 psi and exhibiting $CO_2$ and/or $H_2S$ partial pressures in excess of 10 psi which comprises treating the fluid in the system with the composition which is a quaternary of a polymer of the general unit formula

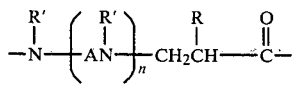

where R is hydrogen or methyl, R' is hydrogen, A is a —CH₂CH₂— moiety of a hydrocarbon polyamine which links amino groups and n is an integer; and crosslinked derivatives thereof, where the polyamine is of the general formula

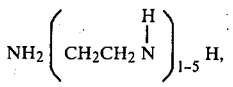

wherein the quaternizing agent is selected from the group consisting of benzyl chloride, ethylene dichloride and p-dodecyl benzyl chloride.

7. The process of claim 6 where the quaternizing agent is benzyl chloride.

8. The process of claim 6 wherein the quaternizing agent is ethylene dichloride.

9. The process of claim 6 wherein the quaternizing agent is p-dodecyl benzyl chloride.

* * * * *